US012654410B2

(12) United States Patent
Kaagman et al.

(10) Patent No.:  US 12,654,410 B2
(45) Date of Patent:  Jun. 16, 2026

(54) TRANSFER WHEEL, TRANSFER DEVICE AND METHOD FOR TRANSFERRING A STRIP TO A TIRE BUILDING DRUM

(71) Applicant: VMI HOLLAND B.V., Epe (NL)

(72) Inventors: Mattheus Jacobus Kaagman, Epe (NL); Ruben Matthias Visser, Epe (NL)

(73) Assignee: VMI HOLLAND B.V., Epe (NL)

( * ) Notice:  Subject to any disclaimer, the term of this patent is extended or adjusted under 35 U.S.C. 154(b) by 181 days.

(21) Appl. No.: 18/226,145

(22) Filed: Jul. 25, 2023

(65) Prior Publication Data

US 2023/0398755 A1  Dec. 14, 2023

Related U.S. Application Data

(62) Division of application No. 17/765,413, filed as application No. PCT/NL2020/050715 on Nov. 12, 2020, now Pat. No. 11,724,474.

(30) Foreign Application Priority Data

Nov. 28, 2019  (NL) ...................................... 2024329

(51) Int. Cl.
 *B29D 30/30*  (2006.01)
 *B29D 30/16*  (2006.01)
 *B29D 30/24*  (2006.01)

(52) U.S. Cl.
 CPC ............. *B29D 30/30* (2013.01); *B29D 30/16* (2013.01); *B29D 2030/241* (2013.01)

(58) Field of Classification Search
 CPC .... B29D 30/16; B29D 30/26; B29D 30/2607; B29D 30/30; B29D 2030/0022; B29D 2030/241

(Continued)

(56) References Cited

U.S. PATENT DOCUMENTS

| | | | |
|---|---|---|---|
| 3,852,142 A | 12/1974 | Leblond | ............. B29D 30/3007 |
| 3,904,471 A | 9/1975 | Kubinski | ........... B29D 30/3007 |

(Continued)

FOREIGN PATENT DOCUMENTS

| | | | |
|---|---|---|---|
| CA | 1137401 | 12/1982 | ...................... 154/15 |
| CN | 106604813 | 4/2017 | ............. B29D 30/20 |

(Continued)

OTHER PUBLICATIONS

Nakajima Masaru, JP-H11291364-A, machine translation. (Year: 1999).*

(Continued)

*Primary Examiner* — Sedef E Paquette
(74) *Attorney, Agent, or Firm* — HAYES SOLOWAY P.C.

(57) ABSTRACT

Disclosed is a transfer device and a method for transferring a strip to a tire building drum, wherein the transfer device includes a transfer wheel that is rotatable about a wheel axis, a base for supporting the transfer wheel and a drive for moving the transfer wheel relative to the base in an application direction perpendicular to the wheel axis, wherein the transfer device further includes an overload protection mechanism that enables the transfer wheel to move with respect to the base in a retraction direction opposite to the application direction irrespective of the drive.

8 Claims, 9 Drawing Sheets

(58) Field of Classification Search
USPC ................................................. 156/117, 123
See application file for complete search history.

(56) References Cited

U.S. PATENT DOCUMENTS

| | | | | |
|---|---|---|---|---|
| 4,891,082 | A | 1/1990 | Broyles et al. ........ | B29D 30/08 |
| 6,488,797 | B1 | 12/2002 | Kirby ........................... | 156/131 |
| 2007/0261578 | A1 | 11/2007 | Suda ...................... | B29D 30/24 |
| 2009/0289143 | A1 | 11/2009 | Tanaka et al. ......... | B65H 75/28 |
| 2021/0221083 | A1 | 7/2021 | De Graaf et al. ... | B29D 30/247 |
| 2021/0379852 | A1 | 12/2021 | Doppenberg et al. . | B29D 30/32 |
| 2022/0332070 | A1 | 10/2022 | Kaagman et al. ..... | B29D 30/30 |

FOREIGN PATENT DOCUMENTS

| | | | | |
|---|---|---|---|---|
| CN | 107848231 | 3/2018 | ............ | B29D 30/32 |
| CN | 110198830 | 9/2019 | ............ | B29C 30/24 |
| CN | 215320794 | 12/2021 | ............ | B29D 30/00 |
| EP | 0273847 | 11/1987 | ............ | B29D 30/00 |
| EP | 1690667 | 8/2006 | ............ | B29D 30/30 |
| EP | 1985561 | 10/2008 | ............ | B65H 35/00 |
| JP | 63200936 | 8/1988 | ............ | B23P 21/00 |
| JP | S63218338 | 9/1988 | ............ | B29D 30/22 |
| JP | 9193259 | 7/1997 | ............ | B29D 30/30 |
| JP | H11291364 A * | 10/1999 | | |
| JP | 2001009928 A * | 1/2001 | | |
| JP | 200267181 | 3/2002 | ............ | B29D 30/20 |
| JP | 2004181950 | 7/2004 | ............ | B29D 30/30 |
| JP | 200541168 | 2/2005 | ............ | B29D 30/26 |
| JP | 2006281695 | 10/2006 | ............ | B29D 30/26 |
| JP | 2009137041 | 6/2009 | ............ | B29D 30/24 |
| JP | 4777585 | 7/2011 | ............ | B29D 30/24 |
| KR | 20080001107 | 1/2008 | ............ | B65G 15/00 |
| KR | 20080095172 | 10/2008 | ............ | B29C 31/08 |
| KR | 100909339 | 7/2009 | ............ | B29D 30/08 |
| KR | 20110072180 | 6/2011 | ............ | B29D 30/80 |
| WO | WO2016016749 | 2/2016 | ............ | B29D 30/26 |
| WO | WO2017039433 | 3/2017 | ............ | B29D 30/26 |
| WO | WO2020008069 | 1/2020 | ............ | B29D 30/26 |

OTHER PUBLICATIONS

Agawa Jirou, JP-2001009928-A, machine translation. (Year: 2001).*
U.S. Appl. No. 17/765,413, filed Mar. 30, 2022.
U.S. Appl. No. 17/765,413, filed Mar. 30, 2022, Kaagman et al.
Office Action issued in Japanese Patent Appln. Serial No. 2021-510193, dated Apr. 1, 2022, with English translation, 4 pages.
International Search Report and Written Opinion issued in PCT/NS2020/050715, dated Jan. 26, 2021, 10 pgs.
Notice of Allowance issued in Korean Patent Appln. Serial No. 10-2022-7021837, dated Jan. 11, 2023, with English translation, 8 pages.
Decision to Grant issued in Japanese Patent Appln. Serial No. 2021-510193, dated Dec. 16, 2022, with English translation, 5 pages.
Office Action issued in Chinese Patent Appln. Serial No. 202011358894.3, dated Nov. 24, 2022, with machine translation, 10 pages.

* cited by examiner

TRANSFER WHEEL, TRANSFER DEVICE AND METHOD FOR TRANSFERRING A STRIP TO A TIRE BUILDING DRUM

CROSS REFERENCE TO RELATED APPLICATIONS

This application is a divisional application of U.S. patent application Ser. No. 17/765,413, filed Mar. 30, 2022, which in turn is a 371 of PCT International patent Application Serial No. PCT/NL2020/050715, filed Nov. 12, 2020, the contents of which are incorporated herein by reference.

BACKGROUND

The invention relates to a transfer device and a method for transferring a strip, in particular a run-flat reinforcement strip or a sidewall strip, to a tire building drum.

EP 1 985 561 A1 discloses a transfer drum with two fixation devices for retaining a sidewall strip while transferring said sidewall strip to a tire building drum. Each fixation device is provided with a plurality of suction elements which are arranged in line transverse to the longitudinal direction of the sidewall strip. The first fixation device is arranged to retain a first end of the sidewall strip. The second fixation device is positioned such that the end of the sidewall strip can be retained by said second fixation device. In EP 1 985 561 A1 it is suggested that at least one of the two fixation devices can be positioned in the circumferential direction of the transfer drum such that it can be adapted to various lengths of the sidewall strip.

SUMMARY OF THE INVENTION

A disadvantage of the transfer drum according to EP 1 985 561 A1 is that the transfer wheel is pressed against the tire building drum with an excessive force or may encounter an irregularity on the transfer wheel or on the tire building drum that causes an excessive force between the transfer wheel and the tire building drum.

It is an object of the invention to provide a transfer device and a method for transferring a strip, in particular a run-flat reinforcement strip or a sidewall strip, to a tire building drum, wherein excessive force between the transfer wheel and the tire building drum can be prevented.

According to a first aspect, the invention provides a transfer device for transferring a strip to a tire building drum, wherein the transfer device comprises a transfer wheel that is rotatable about a wheel axis, a base for supporting the transfer wheel and a drive for moving the transfer wheel relative to the base in an application direction perpendicular to the wheel axis, wherein the transfer device further comprises an overload protection mechanism that enables the transfer wheel to move with respect to the base in a retraction direction opposite to the application direction irrespective of the drive. The overload protection mechanism may become active when the transfer wheel is pressed against the tire building drum with an excessive force or when an irregularity on the transfer wheel or on the tire building drum causes generates an excessive force between the transfer wheel and the tire building drum. The transfer wheel can then be retracted in the retraction direction regardless of whether the drive is still driving the transfer wheel in the application direction.

In a preferred embodiment of the transfer device, the drive is movable as a whole with respect to the base in the retraction direction, wherein the overload protection mechanism comprises a biasing member for biasing the drive with respect to the base in the application direction, wherein said biasing member allows the drive to move as a whole in the retraction direction when an excessive force is exerted on the transfer wheel. By moving the drive as a whole more in the retraction direction than the drive is moving the transfer wheel in the application direction, the net result is that the transfer wheel will be moving in the retraction direction.

More preferably, the biasing member is a pneumatic cylinder. The pneumatic cylinder can act as a dampener that absorbs the force between the transfer wheel and the tire building drum.

In another embodiment the overload protection mechanism comprises a lever that at one end is hingeably coupled to the base and at the other end to the drive.

In another embodiment the biasing member is coupled at one end to the base and at the other end to a position on the lever spaced apart from the coupling of the lever to the base and the drive to exert a biasing force on the lever as a moment of force.

In another embodiment the biasing member is connected to the drive with a linkage that keeps the motion parallel.

In another embodiment the biasing member is coupled directly to the drive.

In another embodiment the biasing member is in line with the drive in the application direction.

According to a second aspect, the invention provides a method for transferring a strip, in particular a run-flat reinforcement strip or a sidewall strip, to a tire building drum using the transfer device according to the first aspect of the invention, wherein the method comprises the step of moving the transfer wheel with respect to the base in a retraction direction opposite to the application direction irrespective of the drive.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
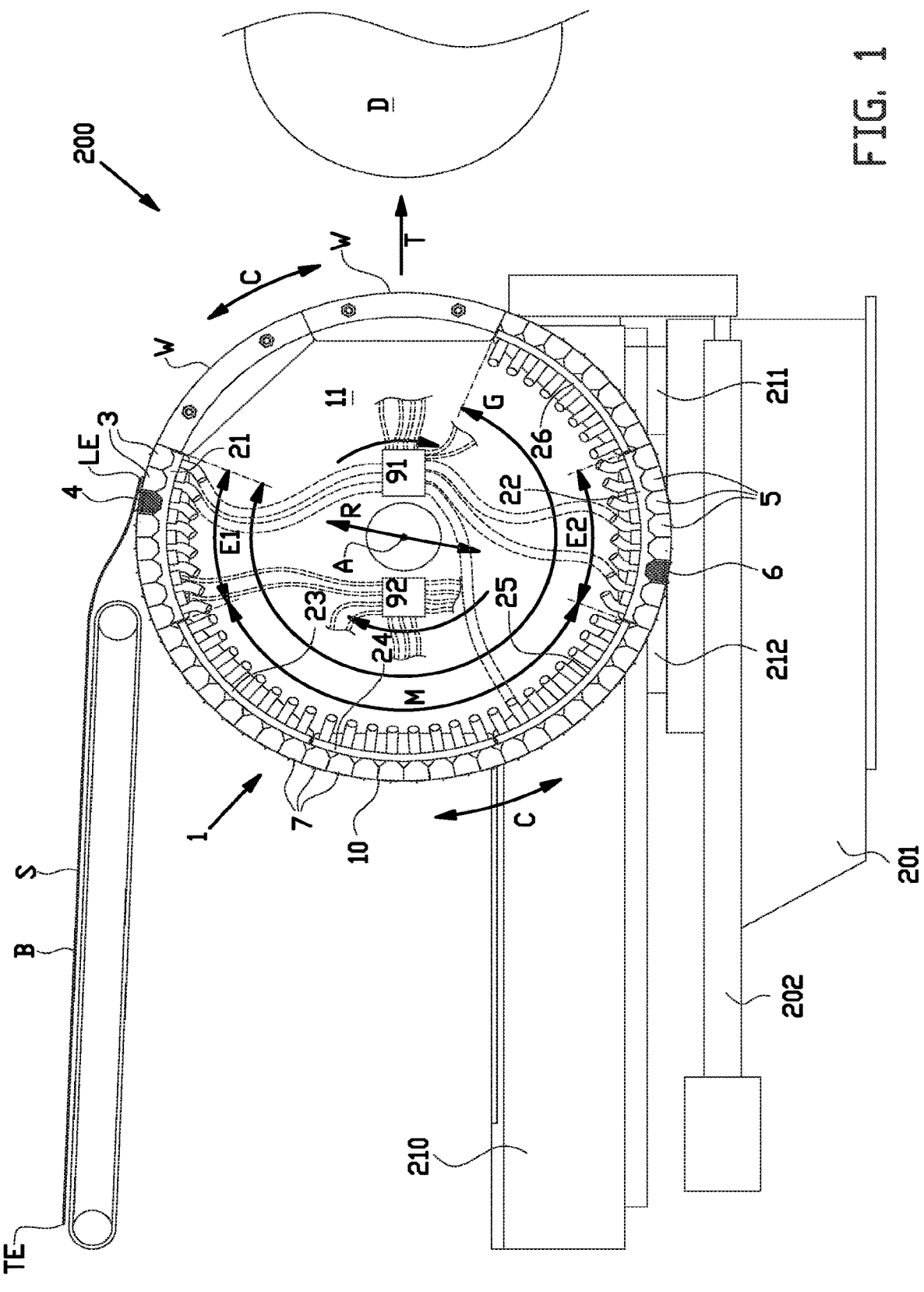
FIG. 1 shows a right side view of a transfer device with a transfer wheel for transferring a strip, in particular a run-flat reinforcement strip or a sidewall strip, to a tire building drum according to a first embodiment of the invention.
Figure 8:
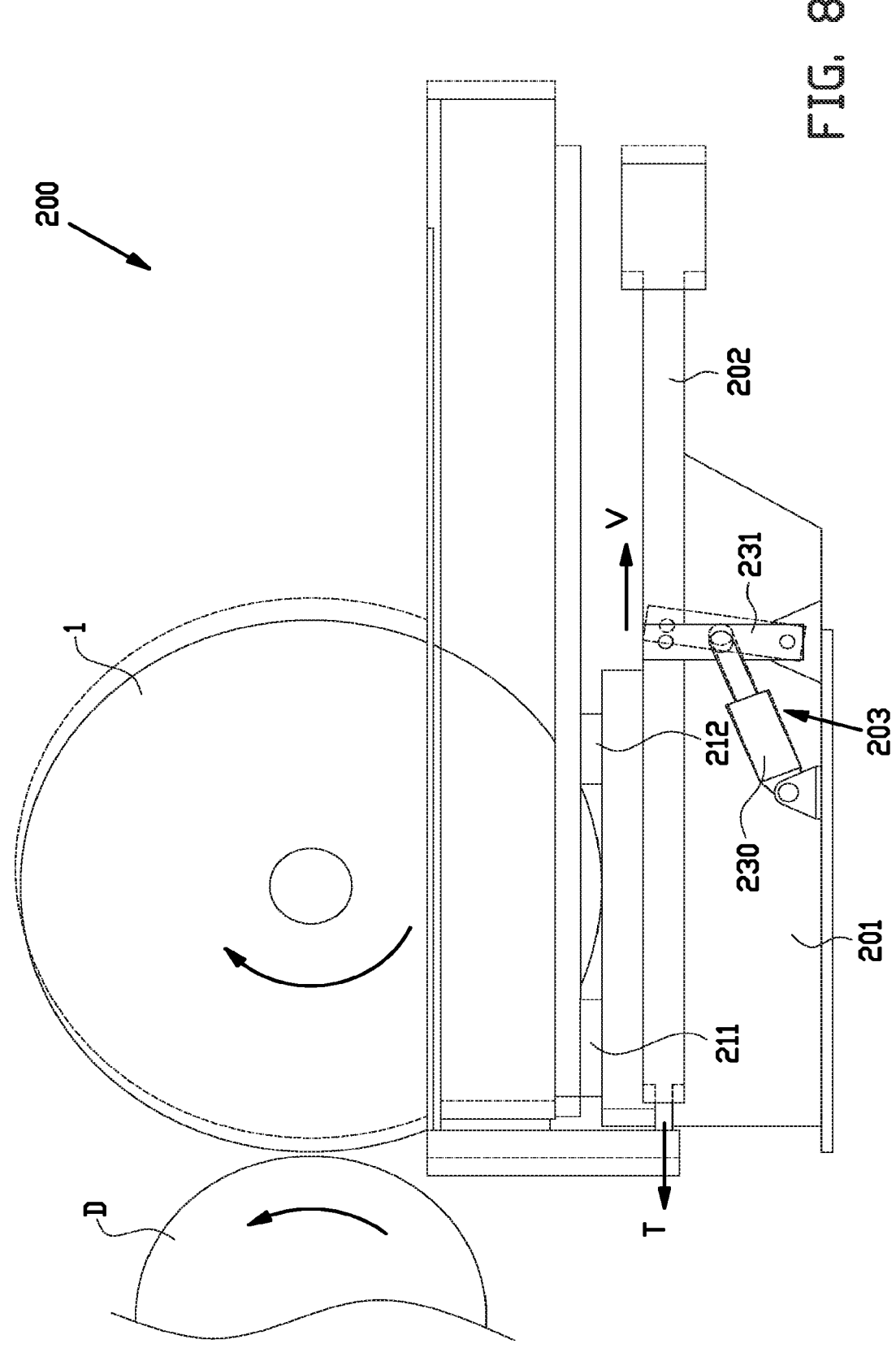
FIG. 8 shows a left side view of the transfer device according to FIG. 1.

FIGS. 1 and 8 show a transfer device 200 comprising a transfer wheel 1 according to a first exemplary embodiment of the invention. The transfer wheel 1 is used for transferring a strip S, in particular a run-flat reinforcement strip or a sidewall strip, to a tire building drum D.

The transfer device 200 further comprises a base 201 for supporting the transfer wheel 1 relative to the tire building drum D and a drive 202 for moving the transfer wheel 1 relative to the base 201 in an application direction T towards the tire building drum D. Preferably, the transfer device 200 comprises a seat 210 for carrying the transfer wheel 201 and one or more guide elements 211, 212, i.e. slide shoes, between the seat 210 and the base 201 that allow transfer wheel 1 to move back and forth with respect to the base 201 in the application direction T. In this exemplary embodiment, the drive 202 is a linear drive, preferably one that is extendable in the application direction T and that is operationally connected to the seat 210 to push or pull the seat 210, and the transfer wheel 1 supported thereon, along in the application direction T.

The strip S has a leading end LE, a trailing end TE and a strip body B extending from the leading end LE to the trailing end TE. The strip S is typically made from an elastomeric material, i.e. rubber.

Figure 2:
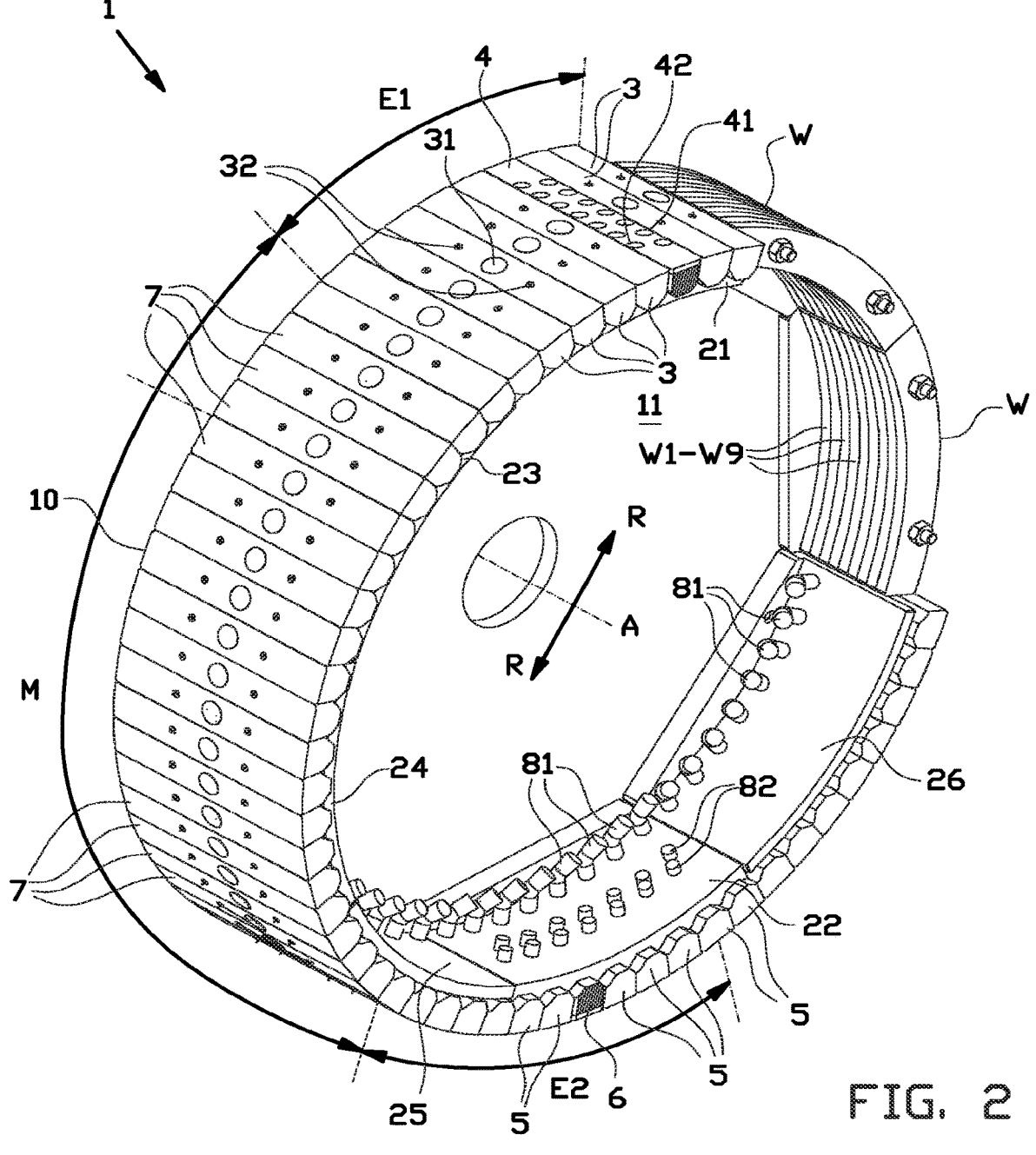
FIG. 2 shows an isometric view of the transfer wheel according to FIG. 1.
Figure 3:
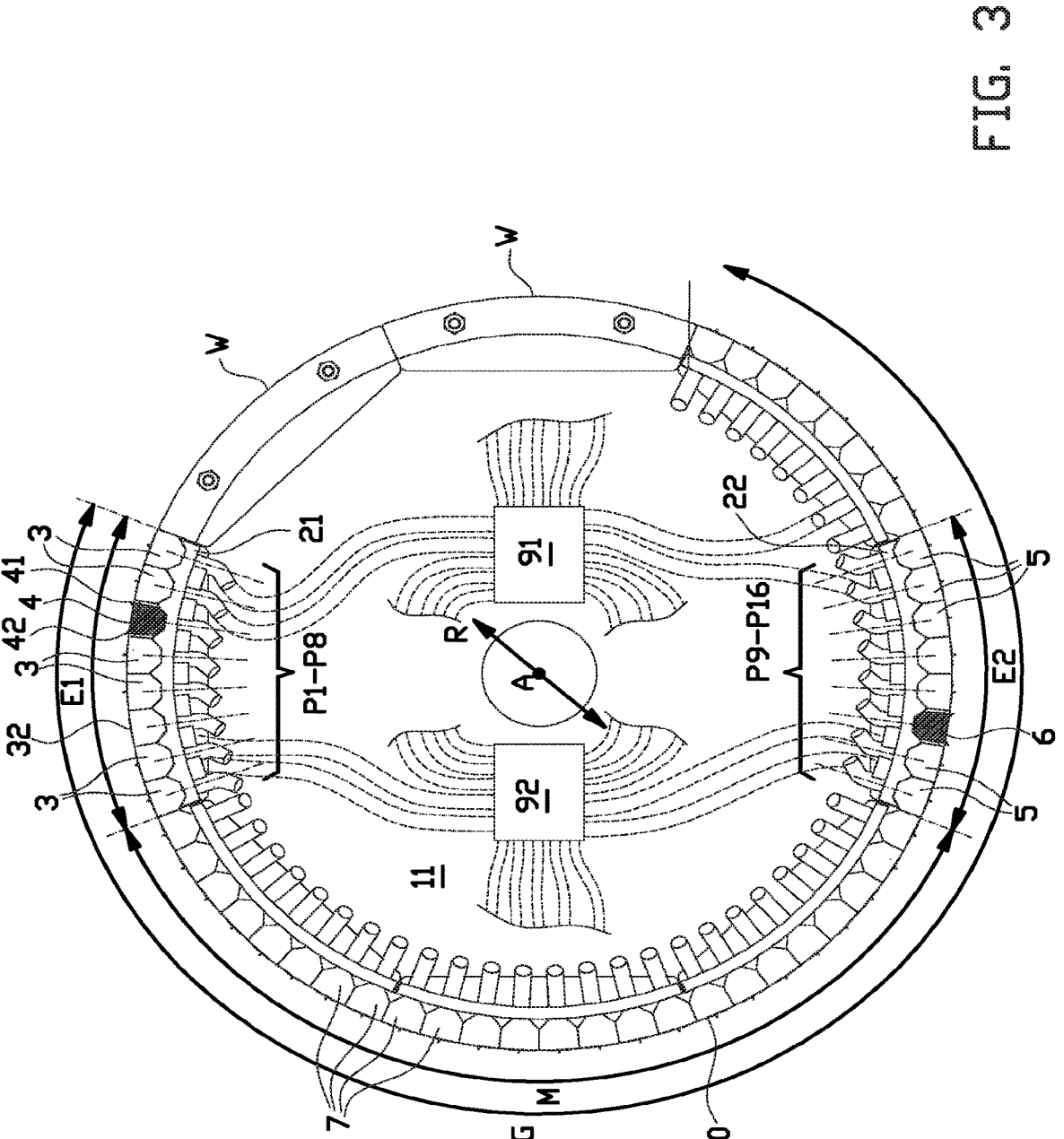
FIG. 3 shows a right side view of the transfer wheel according to FIG. 2.

As shown in FIGS. 1-3, the transfer wheel 1 is rotatable about a wheel axis A. The transfer wheel 1 has a radial direction R perpendicular to said wheel axis A. The transfer wheel 1 is arranged to be driven by a rotational drive (not shown). The transfer wheel 1 has a circumferential surface 10 extending concentrically about the wheel axis A in a circumferential direction C. The transfer wheel 1 defines a retaining area G extending in a circumferential direction C about said wheel axis A for retaining the strip S to the transfer wheel 1. In this exemplary embodiment, the retaining area G is divided into a first end section E1 for retaining the leading end LE, a second end section E2 for retaining the trailing end TE, and a main section M that is located in the circumferential direction C between the first end section E1 and the second end section E2 for retaining the strip body B.

The transfer wheel 1 comprises a wheel body 11 and a plurality of mounting members 21-26 distributed around the wheel body 11 for receiving a plurality of retaining segments 3-7. The plurality of retaining segments 3-7 form and/or define at least a part of the circumferential surface 10 of the transfer wheel 10 and are adapted for retaining the strip S to the circumferential surface 10 along the retaining area G. Preferably, each mounting member 21-26 is arranged for receiving a plurality of retaining segments 3-7, in this example eight per mounting member 21-26. Alternatively, only a single mounting member is provided that is arranged to hold all of the retaining segments 3-7. In yet a further alternative embodiment, one or more of the mounting members 21-26 or the single mounting member may be integral with the wheel body 11.

Note that the retaining segments 3-7 can be mounted to and removed from the mounting member(s) 21-26 in a manner explained in more detail hereafter and thus do not necessarily form part of the transfer wheel 1. The transfer wheel 1 may however be offered with the retaining segments 3-7 already included and/or mounted to the transfer wheel 1.

One or more of the retaining segments is preferably provided with a relatively soft outer surface that can easily adapt to the shape of the strip S and/or irregularities in said strip S. The soft, resiliently deformable outer surface may closely conform to the material, thereby dispersing air and preventing the formation of air pockets. In particular, the retaining segments may be provided with a polyurethane coating or silicone rubber coating that is glued to or vulcanized onto the main body of the retaining segments to form the radially outer surface thereof. Alternatively, a coating may be used that prevents sticking of the tacky strip S to the retaining segments, i.e. with a coating comprising PTFE or Teflon.

As shown in more detail in FIG. 3, the plurality of mounting members 21-26 comprises a first mounting member 21 that forms and/or defines a plurality of first mounting positions P1-P8, in this example eight first mounting positions P1-P8, for receiving a first group of retaining segments 3, 4 at the first end section E1. The plurality of mounting members 21-26 further comprises a second mounting member 22 that forms and/or defines a plurality of second mounting positions P9-P16, in this example eight second mounting positions P9-P16, for receiving a second group of retaining segments 5, 6. The plurality of mounting members 21-26 further comprises a number of further mounting members 23-26, each forming and/or defining a plurality of further mounting positions for receiving a plurality of retaining segments 7.

The first mounting member 21 is arranged for receiving the retaining segments 3, 4 of the first group directly adjacent to each other in the circumferential direction C in the respective first mounting positions P1-P8. Similarly, the second mounting member 22 is arranged for receiving the retaining segments 5, 6 of the second group directly adjacent to each other in the circumferential direction C in the respective first mounting positions P9-P16.

The first group of retaining segments 3, 4 comprises a plurality of first body retaining segments 3 for retaining the strip body B and a first end retaining segment 4 for retaining the leading end LE of the strip S.

Figure 4:
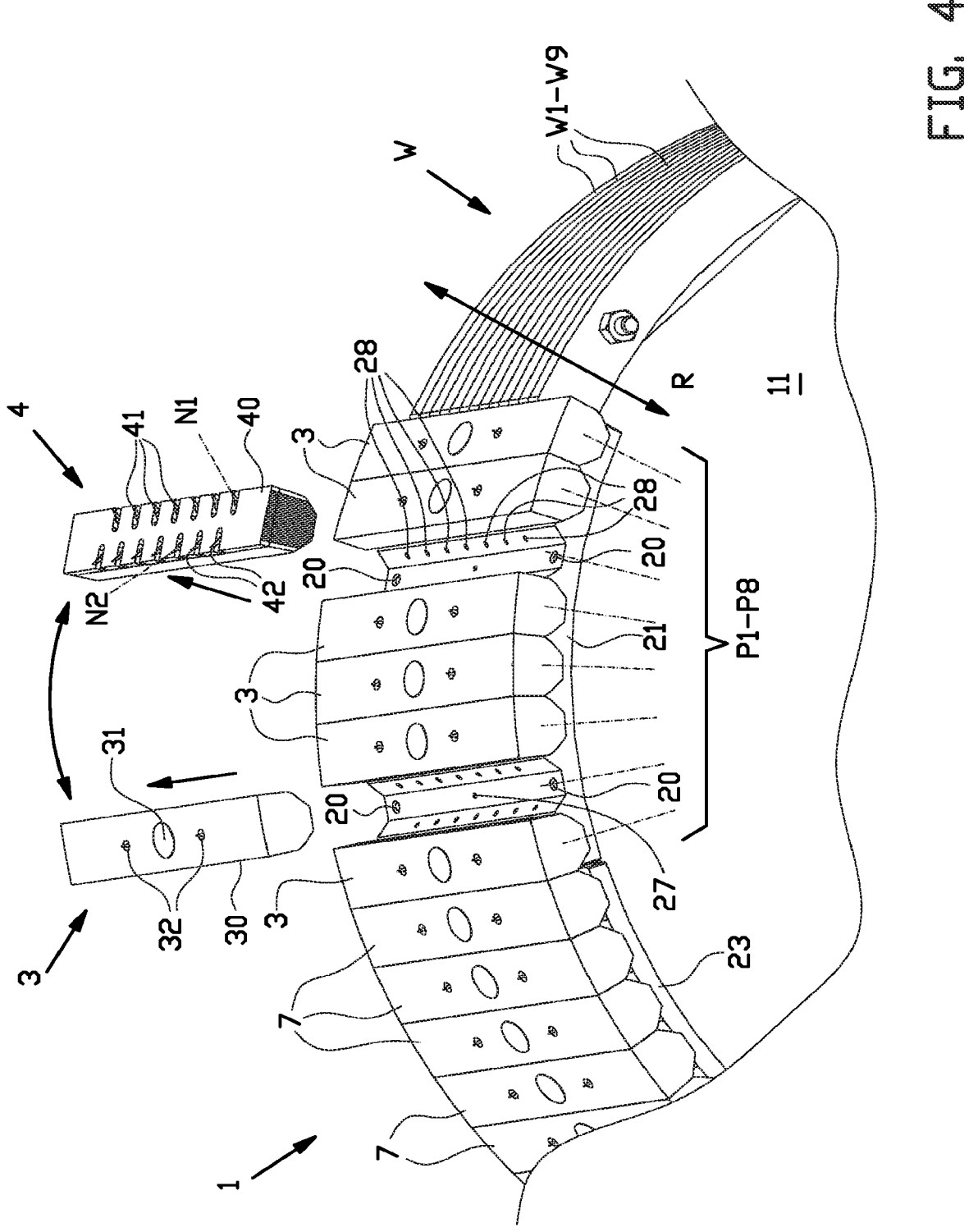
FIGS. 4 and 5 show, from above and below, respectively, a detail of the transfer wheel according to FIG. 2.

As best seen in FIG. 4, each first body retaining segment 3 comprises a segment body 30 and at least one body retaining element 31, 32 arranged at the radially outward facing side of the segment body 30 for retaining the strip body B to the respective first body retaining segment 3. The segment body 30 is suitably shaped and/or dimensioned to fit into one of the mounting positions P1-P8 of the first mounting member 21.

In this exemplary embodiment, each first body retaining segment 3 comprises two types of body retaining elements 31, 32 which are different from each other in the way that they engage the strip body B. In particular, the first type is a suction element 31 for retaining the strip body B to the respective first body retaining segment 3 through suction. Alternatively, an under-pressure suction element 31 may be generated in the suction element 31 by means of a Venturi element that is operationally connected to a source of compressed air.

Figure 5:
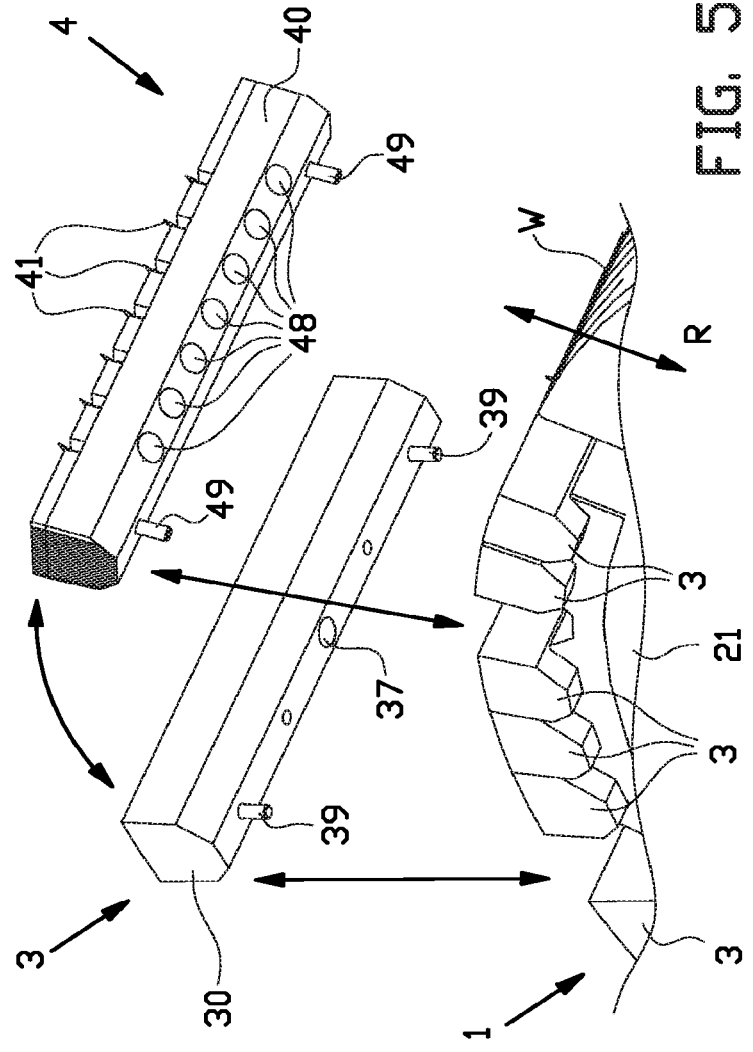

As shown in FIG. 5, the first body retaining segment 3 comprises a first input opening 37 for operationally connecting the suction element 31 to a source of partial vacuum or compressed air at or near the transfer wheel 1. The first input opening 37 is preferably located at a side of the segment body 30 that is in direct contact with surface of the first mounting member 21 having a corresponding first output opening 27.

The second type is a needle 32. The first body retaining segment 3 as shown in FIG. 4 has two needles 32, one on either side of the suction element 31. Both types of body retaining elements 31, 32 are arranged for engaging the strip body B in the radial direction R. The suction element 31 can effectively pull the strip body B onto the needles 32 and simultaneously prevent retraction of the strip body B from the suction element 31 in the radial direction R. The needles 32 can prevent shifting of the strip body B in the circumferential direction C. In this example, the needles 32 are received in threaded bores and are positioned prior to operation of the transfer wheel 1 by screwing or unscrewing their base relative to the thread in the bore. Alternatively, the needles 32 may be permanently fixed in place.

As shown in FIG. 5, the first body retaining segment 3 is provided with two mounting pins 39 that fit in corresponding mounting holes 20 (see FIG. 4) of a respective one of the mounting positions P1-P8. The mounting pins 39 ensure that the first body retaining segment 3 is properly aligned with the respective mounting position P1-P8. The mounting pin 39 may also be a threaded fastener, i.e. a bolt, and the mounting hole 20 may be a threaded bore to receive the threaded fastener. Hence, the first body retaining segment 3 can be tightly secured in its respective mounting position P1-P8.

The first end retaining segment 4, like the first body retaining segment 3, comprises a segment body 40 that is suitably shaped and/or dimensioned to fit into one of the mounting positions P1-P8 of the first mounting member 21. In particular, the shape of the segment body 40 of the first end retaining segment 4 is identical or similar to the shape of the segment body 30 of the first body retaining segments 3 so that they fit interchangeably in the same mounting positions P1-P8. As shown in FIG. 5, the first end retaining segment 4 is provided with mounting pins 49 similar to and in the same position as the mounting pins 39 of the first body retaining segments 3. Hence, the mounting pins 49 of the first end retaining segment 4 can be aligned with and fitted into the mounting holes 20 of a respective one of the mounting positions P1-P8 in the same way as the first body retaining segments 3, thus providing the interchangeability.

The first end retaining segment 4 differs from the previously discussed first body retaining segments 3 in that, instead of the body retaining elements 31, 32, the first end retaining segment 4 comprises at least one end retaining element 41, 42 that is different in operation or in the way in which the strip S is engaged from the body retaining elements 31, 32. In other words, the at least one end retaining element 41, 42 is dedicated for retaining the leading end LE.

In this particular embodiment, as best seen in FIG. 4, the at least one end retaining element 41, 42 comprises a plurality of first needles 41 for piercing into the leading end LE in a first engagement direction N1 and a plurality of second needles 42 for piercing into said leading end LE in a second engagement direction N2 different from the first engagement direction N1. Said engagement directions N1, N2 are oblique to the radial direction R at the mounting position P1-P8 of the respective first end retaining segment 4. The first engagement direction N1 and the second engagement direction N2 are preferably offset over an angle of at least thirty degrees, preferably at least seventy degrees. Hence, the first needles 41 and the second needles 42 are arranged in a cross-wise configuration. Preferably, the first needles 41 and the second needles 42 alternate with each other.

As such, the retaining elements 41, 42 are arranged for engaging the leading end LE in at least one engagement direction N1, N2 oblique to a radial direction R. The oppositely angled needles 41, 42 ensure that the leading end LE, once pierced, cannot be easily removed from the first end retaining segment 4, at least not without damaging the strip S. The first needles 41 and the second needles 42 are movable in their respective engagement direction N1, N2 between a piercing position protruding at least partially outside of the segment body 40 and a release position retracted inside the segment body 40.

Figure 7:
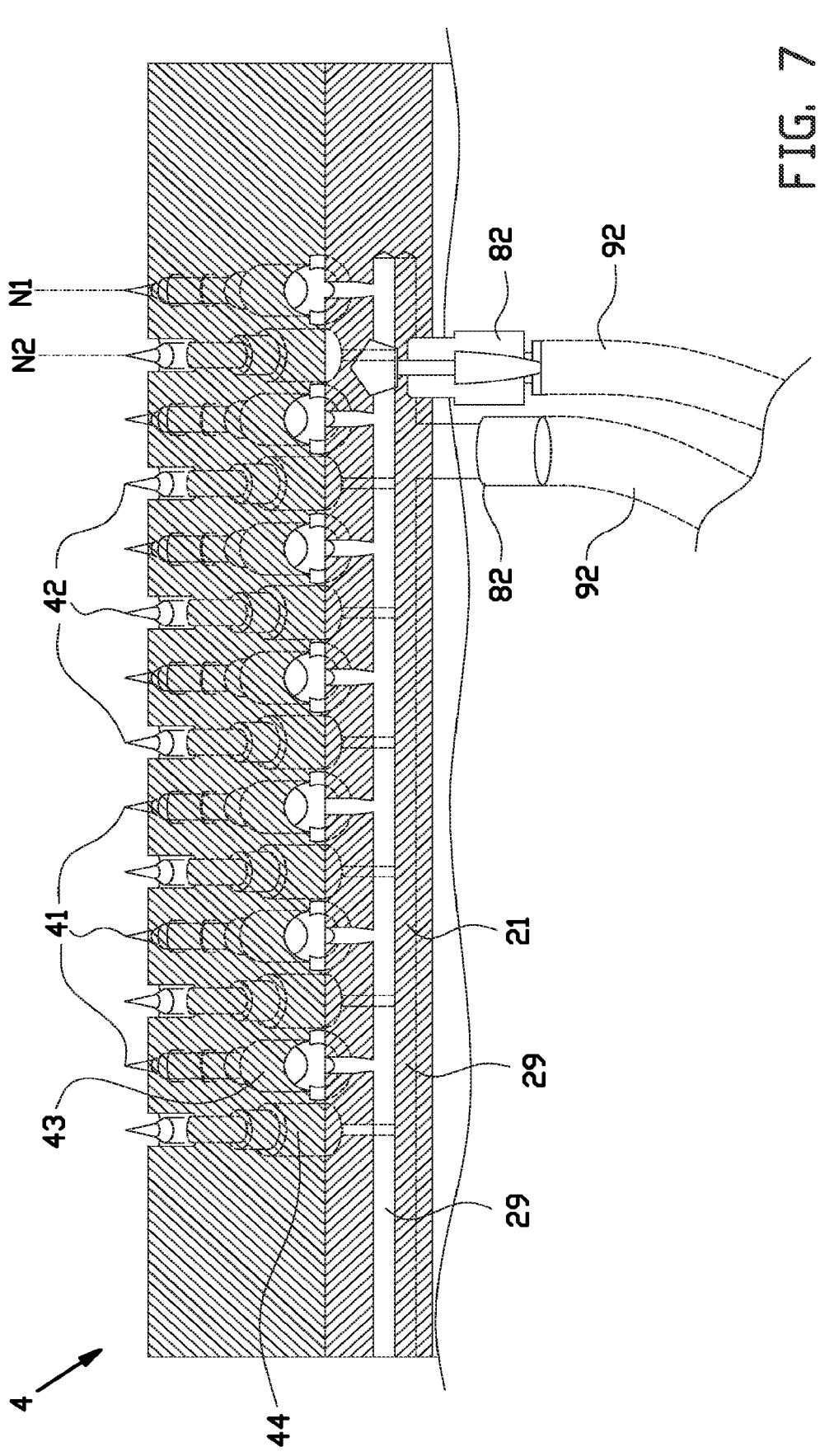
FIG. 7 shows a cross section of the transfer wheel according to the line VII-VII in FIG. 3.

As best seen in the cross section of FIG. 7, each of the needles 41, 42 is received in a respective bore or chamber 43, 44 in the segment body 40 and acts like a plunger that can be driven and retracted pneumatically through the bore or chamber 43, 44 in the respective engagement direction N1, N2. Each bore or chamber 43, 44 is operationally connected to a pneumatic source to actuate the respective needle 41, 42.

As shown in FIG. 5, the first end retaining segment 4 comprises a plurality of second input openings 48 for operationally connecting the bores or chambers 43, 44 to a source of partial vacuum or compressed air at or near the transfer wheel 1. The second input openings 48 are preferably located at a side of the segment body 40 that is in direct contact with a surface of the first mounting member 21 having a plurality of corresponding second output openings 28 at the first mounting member 21. The first mounting member 21 is provided with one or more air channels 29 that are arranged in air communication with the plurality of second output openings 28. Alternatively, one or more air channels may be provided in the first end retaining segment 4 to connect several or all of the bores or chambers 43, 44 to a single second input opening 48.

As shown in FIGS. 4 and 5, the first mounting member 21 is arranged for interchangeably receiving one first body retaining segment 3 of the plurality of first body retaining segments 3 or the first end retaining segment 4 in each first mounting position P1-P8 of the plurality of first mounting positions P1-P8. In the example as shown, the first body retaining segment 3 in the second mounting position P2 is interchanged with the first end retaining segment 4 in the sixth mounting position P6. The first mounting member 21 is arranged for receiving and releasing said one first body retaining segment 3 and said first end retaining segment 4 in the radial direction R. Alternatively, the retaining segments 3, 4 may be slid out of their respective mounting positions P1-P8 in an axial direction, the radial direction R or a combination thereof.

Figure 6:
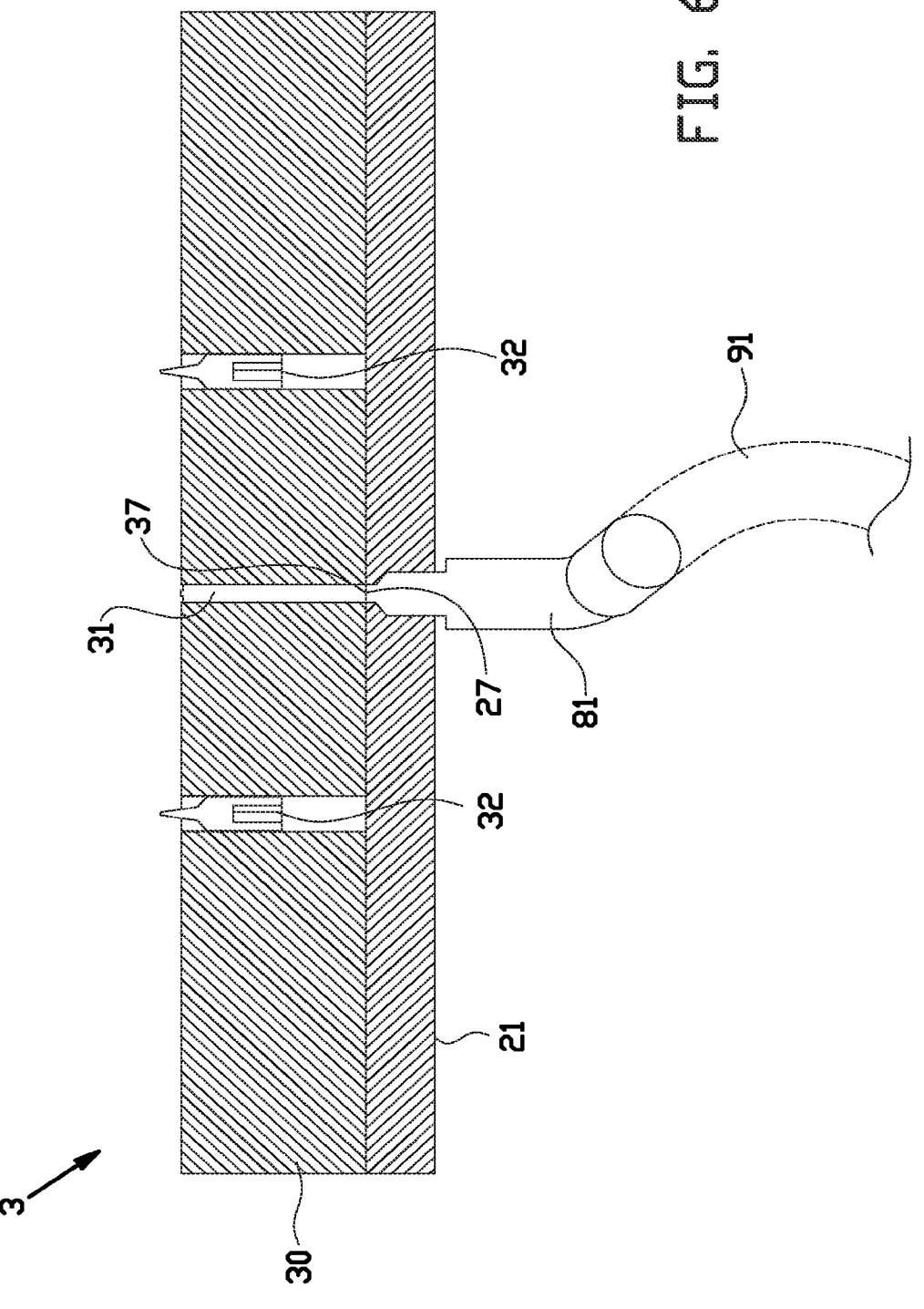
FIG. 6 shows a cross section of the transfer wheel according to the line VI-VI in FIG. 3.

As schematically shown in FIGS. 3, 6 and 7, the transfer wheel 1 comprises at least one first control member 91 for controlling the body retaining elements 31, 32 of the first body retaining segments 3. The transfer wheel 1 further comprises at least one second control member 92 for controlling the at least one end retaining element 41 of the first end retaining segment 4. The body retaining elements 31, 32 need to be controlled independently from the end retaining element 41, for example when the strip body B is to be released earlier than the leading end LE. However, because of the interchangeability of the retaining segments 3, 4, the mounting position P1-P8 of the first end retaining segment 4 is unknown. Hence, to enable the aforementioned independent control, the transfer wheel (1, 101) comprises, at each first mounting position P1-P8, a first connector 81 for operationally connecting the at least one first control member 91 to the at least one body retaining element 31, 32 of the first body retaining segment 3 and a second connector 82 for operationally connecting said at least one second control member 92 to the at least one end retaining element 41 of the first end retaining segment 4. Hence, depending on which one of the first body retaining segment 3 and the first end retaining segment 4 is mounted to the respective first mounting position P1-P8, connection can be made between either the first control member 91 and the first connector 81 or the second control member 92 and the second connector 82.

As best seen in FIG. 6, the first connector 81 is arranged to be in communication with the first output opening 27 of the first mounting member 21. As best seen in FIG. 7, the second connector 82 is arranged to be in communication with the one or more air channels 29 in the first mounting member 21, and is therefore indirectly in communication with each of the second output openings 28 of the first mounting member 21.

The transfer wheel 1 is unable to establish the operational connection between the first control member 91 and the first end retaining segment 4 via the first connector 81. On the other hand, the transfer wheel 1 unable to establish the operational connection between the second control member 92 and the first body retaining segment 3 via the second connector 92. In particular, the first connector 81 is designed so as to be incompatible (directly or indirectly) for connection with first end retaining segment 4 and the second connector 82 is designed so as to be incompatible (directly or indirectly) for connection with first body retaining segment 3. The incompatibility can be obtained by offsetting the positions of the connectors 81, 82 so that the first output opening 27 associated with the first connector 81 is misaligned with the second input opening 48 of the first end retaining segment 4 and so that the second output opening 28 associated with the second connector 82 is misaligned with the first input opening 37 of the first body retaining segment 3.

More preferably, to prevent that the second control member 92 unintentionally controls the body retaining elements 31, 32 of the first body retaining segment 3, the segment body 30 of the first body retaining segment 3 is adapted such that the segment body 30 seals the second output opening 28 of the first mounting member 21 in a respective one of the first mounting positions P1-P8 where the first body retaining segment 3 is mounted. Similarly, the segment body 40 of the first end retaining segment 4 is adapted such that the segment body 40 seals the first output opening 27 of the first mounting member 21 in a respective one of the first mounting positions P1-P8 where the first end retaining segment 4 is mounted.

As shown in FIGS. 1 and 3, the control members 91, 92 may be arrangement of pneumatic tubes, hoses and/or valve blocks for communicating air between a source and the respective connector 81, 82. In FIGS. 1 and 3, only a few pneumatic tubes are shown for reasons of clarity. In practice, every connector 81, 82 will be operationally connected to a source via a respective one of the control members 91, 92.

Alternatively, the control members 91, 92 may be a source of vacuum or compressed air that is directly connected to the respective connector 81, 82. In yet another alternative embodiment, one or more of the retaining elements 31, 32, 41 may be actuated through a different medium, i.e. hydraulically or electrically, in which case a suitable control members and a suitable connector can be applied.

As shown in FIG. 3, the second mounting member 22 forms and/or defines a plurality of second mounting positions P9-P16 for receiving a second group of retaining segments 5, 6 at the second end section E2. The second group of retaining segments 5, 6 comprises a plurality of second body retaining segments 5 for retaining the strip body B and a second end retaining segment 6 for retaining said the trailing end TE. The second body retaining segments 5 may be similar or identical to the first body retaining segment 3. The second end retaining segment 6 may be similar or identical to the first end retaining segment 4. The second mounting member 22 is arranged for interchangeably receiving one second body retaining segment 5 of the plurality of first body retaining segments 5 or the second end retaining segment 6 in each second mounting position P9-P16 of the plurality of second mounting positions P9-P16. For this purpose, the second mounting member 22 comprises the same or substantially the same connection features as the first mounting member 21. These features will therefore not be discussed in more detail hereafter.

The further mounting members 23-26 define a plurality of mounting positions for receiving further retaining segments 7. The further retaining segments 7 may be similar or identical to the first body retaining segments 3. Alternatively, the further retaining segments 7 may different from said first body retaining segments 3 to avoid confusion between the various retaining segments 3-7. In yet a further alternative embodiment, the further retaining segments 7 may be permanently fixed to their respective further mounting member 23-26.

The further mounting members 23-26 differ from the first mounting member 21 and the second mounting member 22 in that they are not suitable for establishing a connection between the second control members 92 and the second input openings 48 of the first end retaining segment 4. Hence, although the first end retaining segment 4 may be fitted in any one of the mounting positions defined by the further mounting members 23-26, said retaining segment 4 will not be able to function in any one of said mounting positions. Consequently, only the first mounting positions P1-P8 of the first mounting member 21 and the second mounting positions P9-P16 of the second mounting member 22 can be used to interchange the positions of the first end retaining segment 4 and the second end retaining segment 6, respectively, with a respective one of the body retaining segments 3, 5, 7.

Alternatively, the main section M is formed by a single support segment or a plurality of support segments, similar to the mounting member but without mounting positions. Hence, the sole purpose of said support segment(s) is to support the strip body B between the respective end sections E1, E2.

Note that the difference in angle between the first mounting position P1 and the second mounting position P9 which are closest to each other considered in the circumferential direction C across the main section M and the first mounting position P8 and the second mounting position P16 which are furthest away from each other considered in the circumferential direction C across the main section M is at least sixty degrees, preferably at least eighty degrees. Hence, the length of the strip S can be varied with a length difference equal to the arc length of the circumferential surface 10 within of said angle of difference.

As best seen in FIG. 3, the first end section E1 extends over less than one-hundred-and-eighty degrees of the transfer wheel 1 in the circumferential direction C, preferably less than seventy degrees. In this particular example, the first end section E1 spans approximately forty-five degrees. The first end section E1 and the second end section E2 are spaced apart by the main section M in the circumferential direction C over at least one-hundred degrees, preferably at least one-hundred-and-twenty degrees. Preferably, the first end section E1 and the second end section E2 are located diametrically opposite positions to each other.

It can further be observed that the retaining area G extends over less than three-hundred degrees of the transfer wheel 1 in the circumferential direction C, preferably less than two-hundred-and-eighty degrees. The transfer wheel 1 comprises a counter-weight section W in the remaining or unused circumference of the transfer wheel 1, preferably diametrically opposite to the retaining area G. The counter-weight section W may at least partially compensate for the extra weight of the strip S at the retaining area G.

As best seen in FIGS. 2 and 4, the transfer wheel 1 comprises a plurality of counter-weight elements W1-W9 which are selectively combinable into a variable weight counter-weight. The counter-weight elements W1-W9 are preferably plate-like elements that can be sandwiched together to form the counter-weight.

As shown in FIG. 8, the transfer device 200 further comprises an overload protection mechanism 203 that enables the transfer wheel 1 to move with respect to the base 70 in a retraction direction V opposite to the application direction T irrespective of the drive 202.

In particular, the drive 202 as a whole is movable with respect to the base 201 in the retraction direction V. The overload protection mechanism 203 comprises a biasing member 230 that—under normal load conditions—biases the drive 202 with respect to the base 201 in the application direction T. As a result, the transfer wheel 1 is biased to move into contact with the tire building drum D in said application direction T. However, when an excessive force is exerted on the transfer wheel 1, the said biasing member 230 allows the drive 202 to move as a whole against the bias of the biasing member 230 in the retraction direction V.

In this exemplary embodiment the biasing member 230 is a pneumatic cylinder that can act as a dampener or absorber of the excessive load. Preferably, the overload protection mechanism 203 comprises a lever 231 that at one end is hingeably coupled to the base 201 and at the other end to the drive 202. The biasing member 230 is coupled at one end to the base 201 and at the other end to a position on the lever 231 spaced apart from the coupling of the lever 231 to the base 201 and the drive 202 to exert a biasing force on the lever 231 as a moment of force.

Alternatively, the biasing member 230 can be connected to the drive 202 with the use of a more complex linkage, to keep the motion more parallel. In yet a further alternative embodiment, the biasing member 230 can be coupled directly to the drive 202, i.e. in line with said drive 202 in the application direction T.

Figure 9:
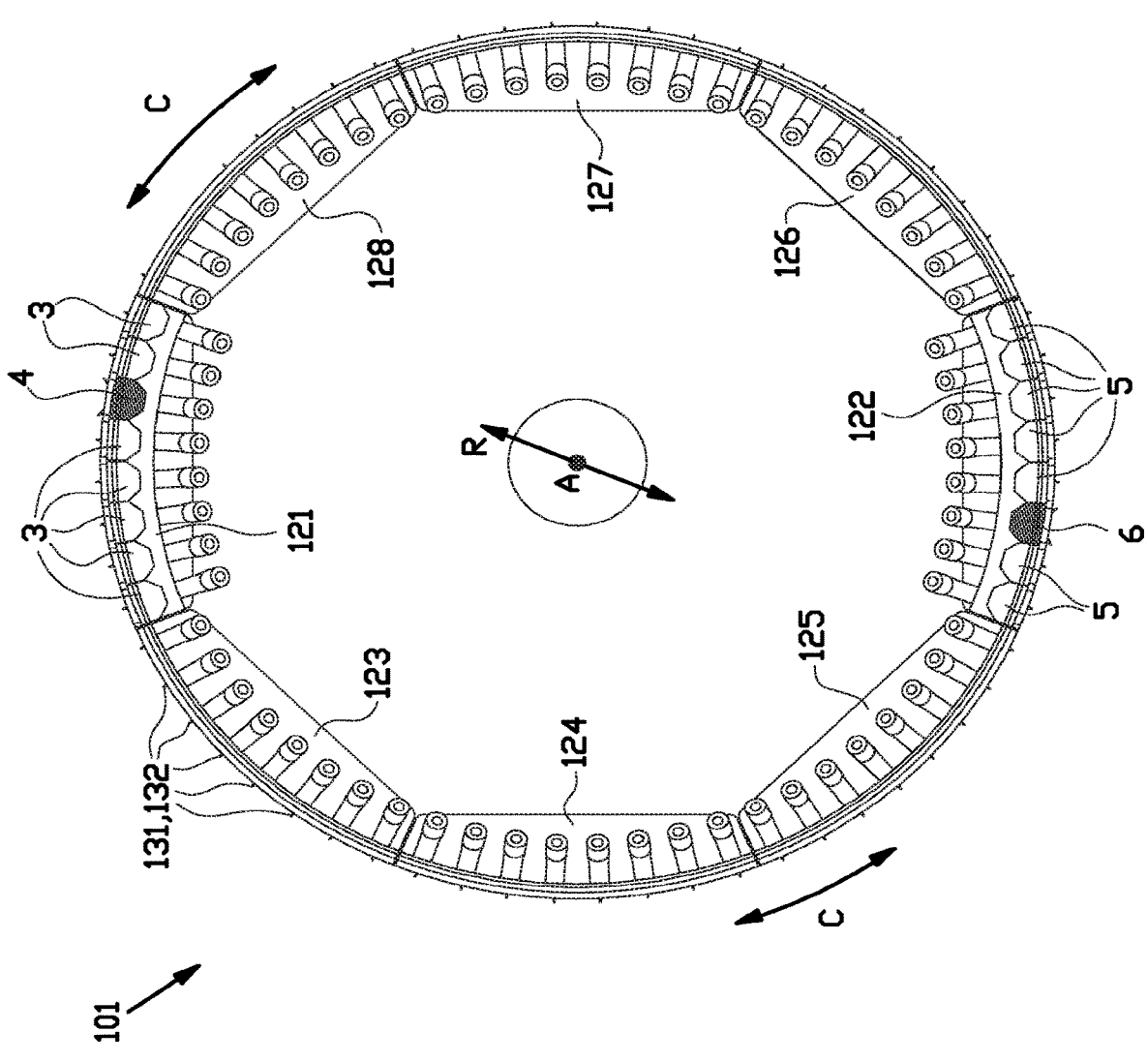
FIG. 9 shows a side view of an alternative transfer wheel according to a second embodiment of the invention.

FIG. 9 shows an alternative transfer wheel 101 according to a second exemplary embodiment of the invention, which differs from the previously discussed transfer wheel 1 in that the retaining area extends around the entire circumference of the transfer wheel 101. Hence, in contrast to the previous embodiment there is no counter-weight section.

The alternative transfer wheel 101 further comprises a first mounting member 121 and a second mounting member 122 similar to the previously described first mounting member 21 and second mounting member 22 for receiving the interchangeable retaining segments 3, 4, 5, 6. However, by way of example, the alternative transfer wheel 101 features alternative further mounting members 123-128 with integrated retaining elements 131, 132 rather than mountable retaining segments. This is why the alternative transfer wheel 101 can be relatively light-weight, which also reduces the need for the counter-weight section.

A method for transferring the strip S to the tire building drum D using the aforementioned transfer wheel 1, 101 is described briefly hereafter with reference to FIGS. 1-9.

The method comprises the step of interchanging one first body retaining segment 3 of the plurality of first body retaining segments 3 with the first end retaining segment 4 in one of the first mounting positions P1-P8 of the plurality of first mounting positions P1-P8.

Optionally, the method further comprises the step of interchanging one second body retaining segment 5 of the plurality of second body retaining segments 5 with the second end retaining segment 6 in one of the second mounting positions P9-P16 of the plurality of second mounting positions P9-P16.

By changing the position of the first end retaining segment 4 and/or the second end retaining segment 6, the position where the leading end LE and/or the trailing end TE of the strip S is retained can be adapted, to facilitate retaining strips S of different lengths to the transfer wheel 1, 101.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, more than one first end retaining segment 4 may be used in the first end retaining area E1, i.e. to retain the leading end LE over a larger surface area and/or to increase the flexibility of the placement of said multiple first end retaining segments 4. Similarly, more than one second end retaining segment 6 can be provided at the send end retaining area E2.

Moreover, the first mounting member 21, 121 and the second mounting member 22, 122 themselves may be interchangeably received on and/or mounted to the wheel body 11 of the transfer wheel 1, 101 to allow for them to be exchanged with any one of the further mounting members 23-26, 123-128 to provide even greater flexibility for positioning, placing and/or mounting the end retaining segments 4, 6. For example, in FIG. 1, the second mounting member 22 may be interchanged with any one of the further mounting members 25, 26 on either side of the current position as shown.

In summary, the invention relates to a transfer wheel 1, 101, a transfer device 200 and a method for transferring a strip S, in particular a run-flat reinforcement strip or a sidewall strip, to a tire building drum D, wherein the transfer wheel 1, 101 defines a retaining area G that is divided into a first end section E1 for retaining the leading end LE, a second end section E2 for retaining the trailing end TE and a main section M for supporting the strip body B, wherein the transfer wheel 1, 101 comprises a first mounting member 21 that defines first mounting positions P1-P8 for receiving a first group of retaining segments 3, 4 at the first end section E1, wherein the first group of retaining segments 3, 4 comprises first body retaining segments 3 for retaining the strip body B and a first end retaining segment 4 for retaining the leading end LE, wherein the first mounting member 21 is arranged for interchangeably receiving one first body retaining segment 3 or the first end retaining segment 4 in each first mounting position P1-P8.

LIST OF REFERENCE NUMERALS 1 transfer wheel
10 circumferential surface
11 wheel body
20 mounting hole
21 first mounting member
22 second mounting member
23-26 further mounting members
27 first output opening
28 second output opening
29 air channel
3 first body retaining segment
30 segment body
31 suction element
32 needle 37 first input opening
39 mounting pin
4 first end retaining segment
40 segment body
41 first needle
42 second needle
43 bore or chamber
44 bore or chamber
48 second input opening
49 mounting pin
5 second body retaining segment
6 second end retaining segment
7 further retaining segment
81 first connector
82 second connector
91 first control member
92 second control member
101 alternative transfer wheel
121 first mounting member
122 second mounting member
123-128 further mounting members
131 suction element
132 needle
200 transfer device
201 base
210 seat
211 guide element
212 guide element
202 drive
203 overload protection mechanism
230 biasing member
A wheel axis
B strip body
C circumferential direction
D tire building drum
E1 first end section
E2 second end section
G retaining area
LE leading end
M main section
N1 first engagement direction
N2 second engagement direction
P1-P8 first mounting positions
P9-P16 second mounting positions
S strip TE trailing end

The invention claimed is:

1. A transfer device for transferring a strip to a tire building drum, wherein the transfer device comprises a transfer wheel that is rotatable about a wheel axis, a base for supporting the transfer wheel and a drive for moving the transfer wheel relative to the base in an application direction perpendicular to the wheel axis, wherein the transfer device further comprises an overload protection mechanism that enables the transfer wheel to move with respect to the base in a retraction direction opposite to the application direction irrespective of the drive, wherein the drive as a whole is movable with respect to the base in the retraction direction, wherein the overload protection mechanism comprises a biasing member configured for biasing the drive with respect to the base in the application direction, wherein said biasing member allows the drive to move back-and-forth as a whole in the retraction direction when an excessive force is exerted on the transfer wheel.

2. The transfer device according to claim 1, wherein the biasing member is a pneumatic cylinder.

3. The transfer device according to claim 1, the overload protection mechanism comprises a lever that at one end is hingably coupled to the base and at the other end to the drive.

4. The transfer device according to claim 3, wherein the biasing member is coupled at one end to the base and at the other end to a position on the lever spaced apart from the coupling of the lever to the base and the drive to exert a biasing force on the lever as a moment of force.

5. The transfer device according to claim 1, the biasing member is connected to the drive with a linkage that keeps the motion parallel.

6. The transfer device according to claim 1, wherein the biasing member is coupled directly to the drive.

7. The transfer device according to claim 6, wherein the biasing member is in line with the drive in the application direction.

8. A method for transferring a run-flat reinforcement strip or a sidewall strip to a tire building drum using the transfer device according to claim 1, wherein the method comprises the step of moving the transfer wheel with respect to the base in the retraction direction opposite to the application direction irrespective of the drive.

* * * * *